F. J. MAY.
Milk Pan.
No. 50,256.
Patented Oct. 3, 1865.
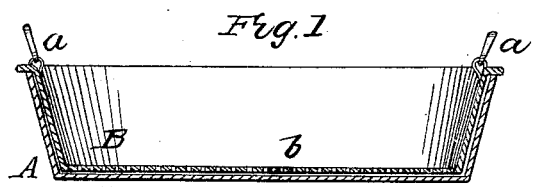
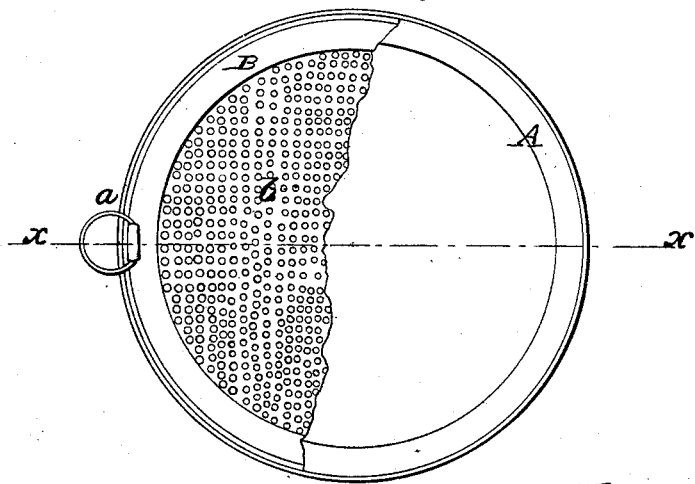

UNITED STATES PATENT OFFICE.

FRANKLIN J. MAY, OF NEW YORK, N. Y.

IMPROVED MILK-PAN.

Specification forming part of Letters Patent No. 50,256, dated October 3, 1865.

*To all whom it may concern:*

Be it known that I, FRANKLIN J. MAY, of the city, county, and State of New York, have invented a new and Improved Self-Skimming Pan; and I do hereby declare that the following is a full, clear, and exact description thereof, which will enable those skilled in the art to make and use the same, reference being had to the accompanying drawings, forming part of this specification, in which—

Figure 1 is a vertical section of my invention, taken in the line $x$ $x$, Fig. 2; Fig. 2, a plan sectional view of the same, a portion of the inner pan being broken away.

Similar letters of reference indicate corresponding parts.

This invention consists in the employment or use of two pans placed one within the other, and the inner pan provided with a perforated bottom to serve as a strainer. The inner pan contains the liquid, and when the latter is required for use the inner pan is lifted or raised from the outer one, the liquid passing through the stainer or perforated bottom of the inner pan and remaining in the outer one. Thus by simply raising the inner pan out from the outer one the skimming is accomplished.

The invention is more especially designed for milk-pans to obviate the necessity of skimming the cream from the surface of milk, which is now performed by means of a spoon—an operation consuming considerable time in large dairies and attended with more or less waste.

A B represent two pans, constructed of sheet metal or other material, and of such relative dimensions that one may be fitted within the other snugly, but not so as to prevent the inner one being readily raised out from the external one. (See Fig. 1.) The inner pan, B, is provided with rings or handles $a$ at two opposite points on its upper rim, to facilitate the lifting of it out from the external pan, A, and the inner pan, B, has a perforated bottom, $b$, to serve as a strainer. When the pan B is inserted in A the perforated bottom $b$ may rest upon the tight bottom of the pan A, as shown in Fig. 1.

The milk or other liquid is poured into the pan B, and by raising B out from A the liquid passes through the perforated bottom $b$ of B, the cream sediment or any particles which cannot pass through the perforated bottom $b$ remaining in B, while the other portion remains in A.

Thus it will be seen that the straining or skimming process is performed in the most expeditious manner possible.

Having thus described my invention, I claim as new and desire to secure by Letters Patent—

The two pans A B, fitted one within the other, and the inner pan provided with a perforated bottom or strainer, $b$, all arranged substantially as and for the purpose set forth.

FRANKLIN J. MAY.

Witnesses:
M. M. LIVINGSTON,
C. L. TOPLIFF.